(12) United States Patent
Kesho et al.

(10) Patent No.: US 9,075,271 B2
(45) Date of Patent: Jul. 7, 2015

(54) LIQUID CRYSTAL DISPLAY DEVICE

(75) Inventors: Masato Kesho, Kanazawa (JP);
Masanobu Nonaka, Nonoichi (JP);
Kazuhiro Takahashi, Kanazawa (JP);
Toshimasa Yonekura, Kanazawa (JP)

(73) Assignee: JAPAN DISPLAY INC., Tokyo (JP)

( * ) Notice: Subject to any disclaimer, the term of this patent is extended or adjusted under 35 U.S.C. 154(b) by 158 days.

(21) Appl. No.: 13/590,643

(22) Filed: Aug. 21, 2012

(65) Prior Publication Data

US 2013/0057795 A1 Mar. 7, 2013

(30) Foreign Application Priority Data

Sep. 6, 2011 (JP) ................................. 2011-194083
Sep. 6, 2011 (JP) ................................. 2011-194087

(51) Int. Cl.
*G02F 1/1343* (2006.01)

(52) U.S. Cl.
CPC .................... *G02F 1/134363* (2013.01); *G02F 2001/134318* (2013.01)

(58) Field of Classification Search
CPC ................................................. G02F 1/134309
USPC .......................................................... 349/139
See application file for complete search history.

(56) References Cited

U.S. PATENT DOCUMENTS

| | | | |
|---|---|---|---|
| 6,266,116 B1 | 7/2001 | Ohta et al. | |
| 2001/0010575 A1* | 8/2001 | Yoshida et al. | 349/141 |
| 2004/0165136 A1 | 8/2004 | Sugiyama et al. | |
| 2005/0206824 A1* | 9/2005 | Son et al. | 349/141 |
| 2005/0206842 A1* | 9/2005 | Wehner et al. | 351/159 |
| 2005/0219453 A1 | 10/2005 | Kubo et al. | |
| 2005/0248715 A1* | 11/2005 | Byun et al. | 349/187 |
| 2007/0115234 A1 | 5/2007 | Kim et al. | |
| 2008/0062358 A1 | 3/2008 | Lee et al. | |
| 2008/0180590 A1* | 7/2008 | Lee et al. | 349/39 |
| 2008/0180623 A1 | 7/2008 | Lee et al. | |
| 2008/0186439 A1 | 8/2008 | Kwon et al. | |
| 2008/0284962 A1* | 11/2008 | Horiguchi et al. | 349/139 |
| 2009/0122247 A1* | 5/2009 | Chang | 349/139 |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/676,566, filed Nov. 14, 2012, Kesho, et al.

(Continued)

*Primary Examiner* — Sang V Nguyen
(74) *Attorney, Agent, or Firm* — Oblon, McClelland, Maier & Neustadt, L.L.P.

(57) ABSTRACT

According to one embodiment, a liquid crystal display device includes a first substrate including a pixel electrode which is located in an inside surrounded by a first gate line, a second gate line, a first source line and a second source line, and a second substrate including a common electrode. The pixel electrode includes a contact portion, two or more main pixel electrodes, and a connection portion connecting the main pixel electrodes. The common electrode includes main common electrodes located above the first gate line, above the second gate line and above a point between the main pixel electrodes, and sub-common electrodes located above the first source line and above the second source line.

14 Claims, 13 Drawing Sheets

(56) References Cited

U.S. PATENT DOCUMENTS

| | | | |
|---|---|---|---|
| 2010/0090938 A1* | 4/2010 | Kamada et al. | 345/92 |
| 2010/0188621 A1* | 7/2010 | Nakanishi | 349/96 |
| 2011/0273653 A1* | 11/2011 | Yoshida et al. | 349/138 |

FOREIGN PATENT DOCUMENTS

| | | | |
|---|---|---|---|
| JP | 09-159996 A | 6/1997 | |
| JP | 9-160041 | 6/1997 | |
| JP | 9-160042 | 6/1997 | |
| JP | 9-160061 | 6/1997 | |
| JP | 10-26765 | 1/1998 | |
| JP | 10-90708 | 4/1998 | |
| JP | 11-119237 A | 4/1999 | |
| JP | 2005-3802 | 1/2005 | |
| JP | 3644653 | 2/2005 | |
| JP | 2005-070729 * | 3/2005 | G02F 1/139 |
| JP | 2005-242307 | 9/2005 | |
| JP | 2006-259725 A | 9/2006 | |
| JP | 2009-42630 | 2/2009 | |
| JP | 2009-109657 A | 5/2009 | |
| JP | 2009-192822 | 8/2009 | |
| WO | WO 2008/129748 A1 | 10/2008 | |

OTHER PUBLICATIONS

U.S. Appl. No. 13/548,644, filed Jul. 13, 2012, Kesho, et al.
U.S. Appl. No. 13/589,597, filed Aug. 20, 2012, Yonekura, et al.
U.S. Appl. No. 13/603,942, filed Sep. 5, 2012, Kesho, et al.
U.S. Appl. No. 13/614,344, filed Sep. 13, 2012, Kesho, et al.
U.S. Appl. No. 13/645,734, filed Oct. 5, 2012, Kesho, et al.
Office Action issued Mar. 24, 2015 in Japanese Patent Application No. 2011-194083 (with English Translation).
Office Action issued Mar. 24, 2015 in Japanese Patent Application No. 2011-194087 (with English Translation).

* cited by examiner

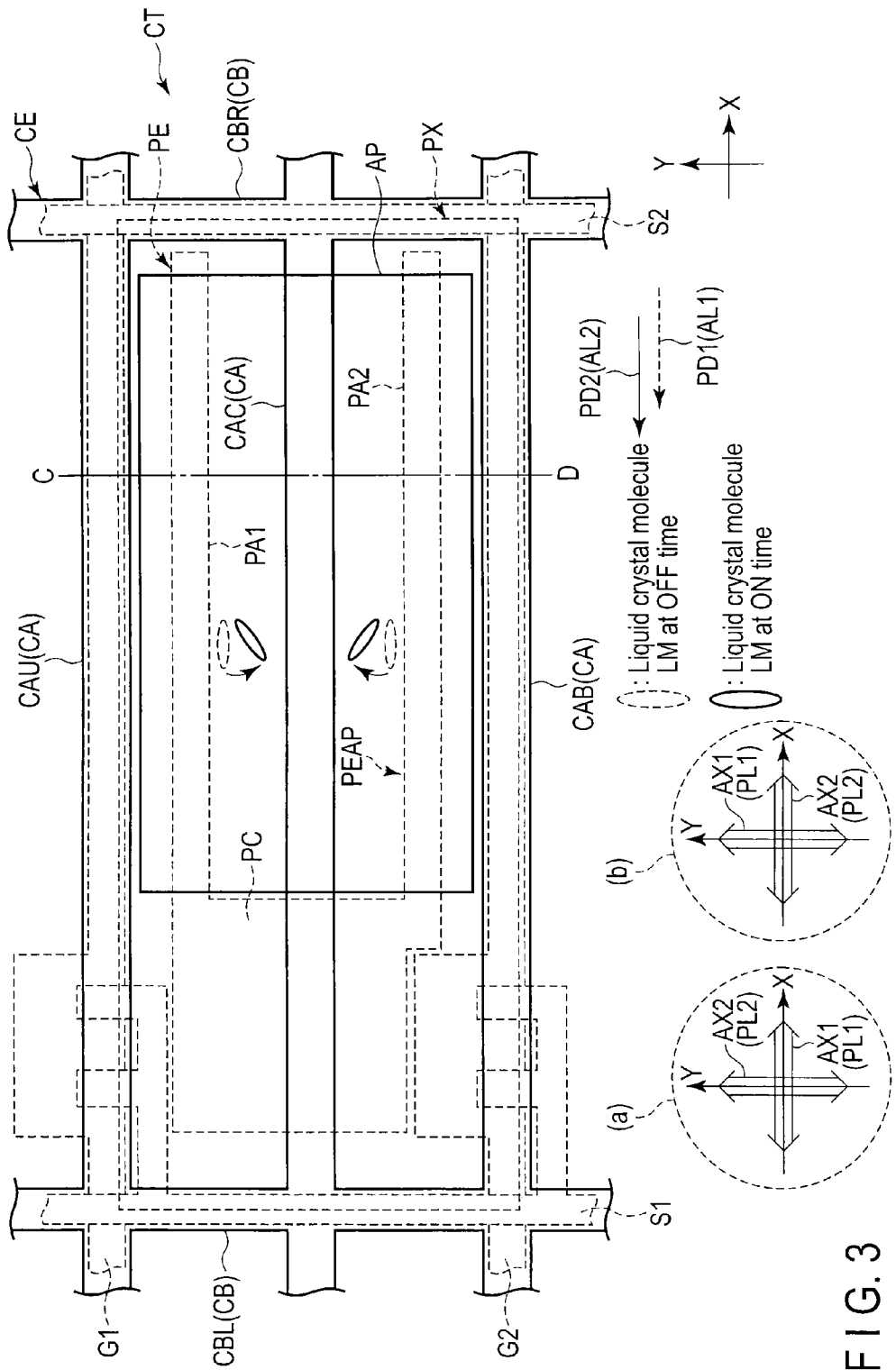
F I G. 3

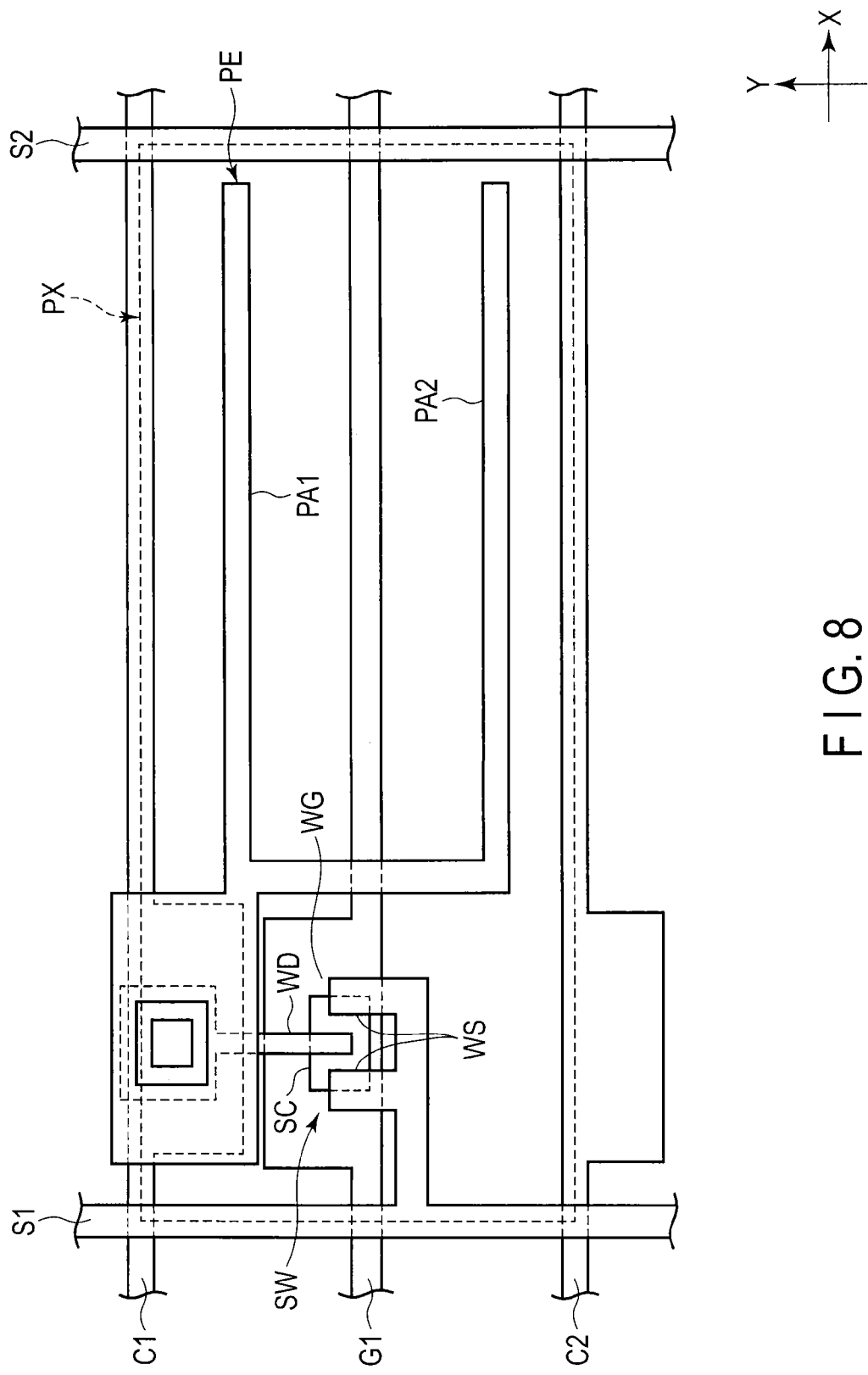
F I G. 8

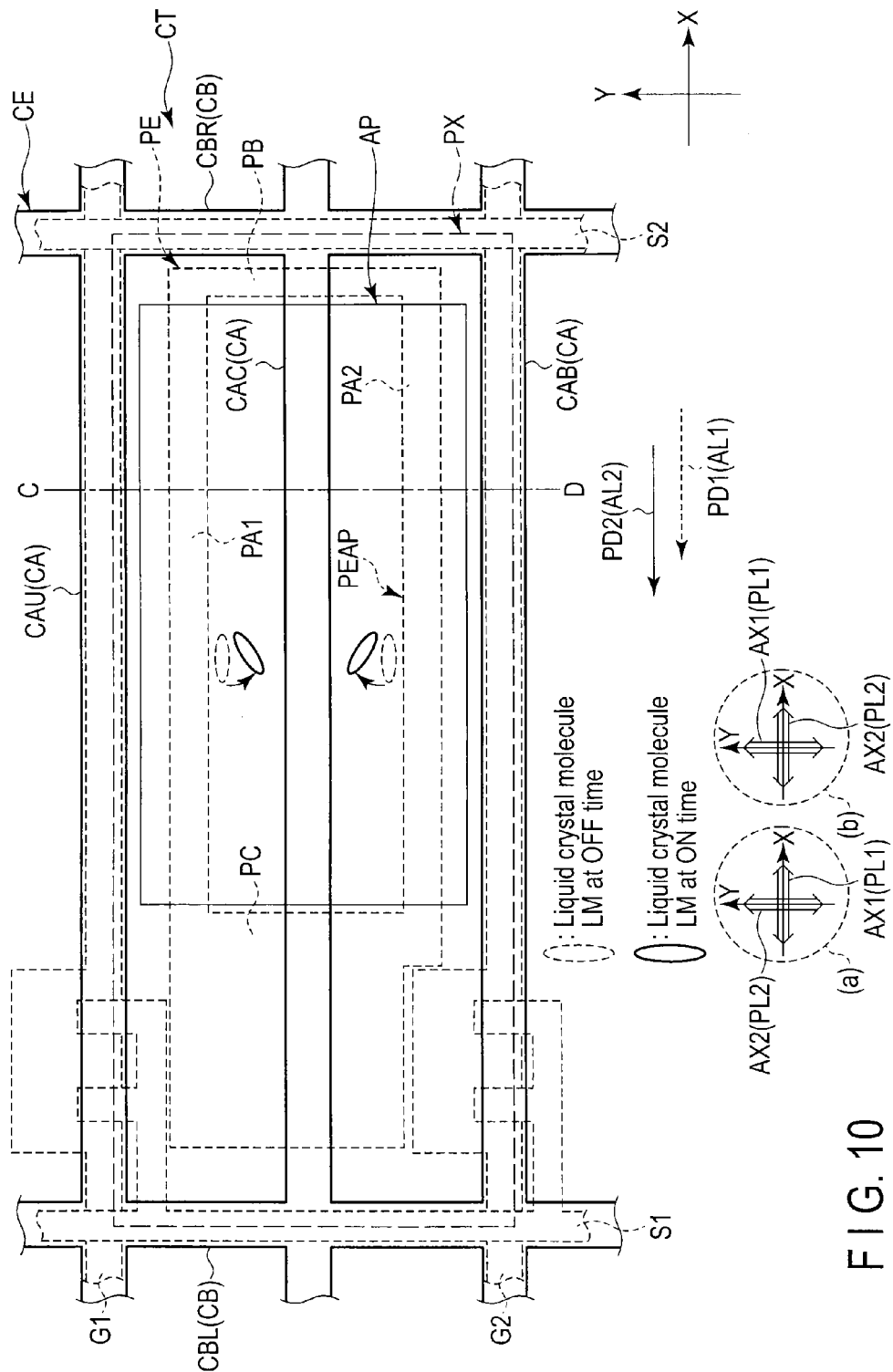
F I G. 10

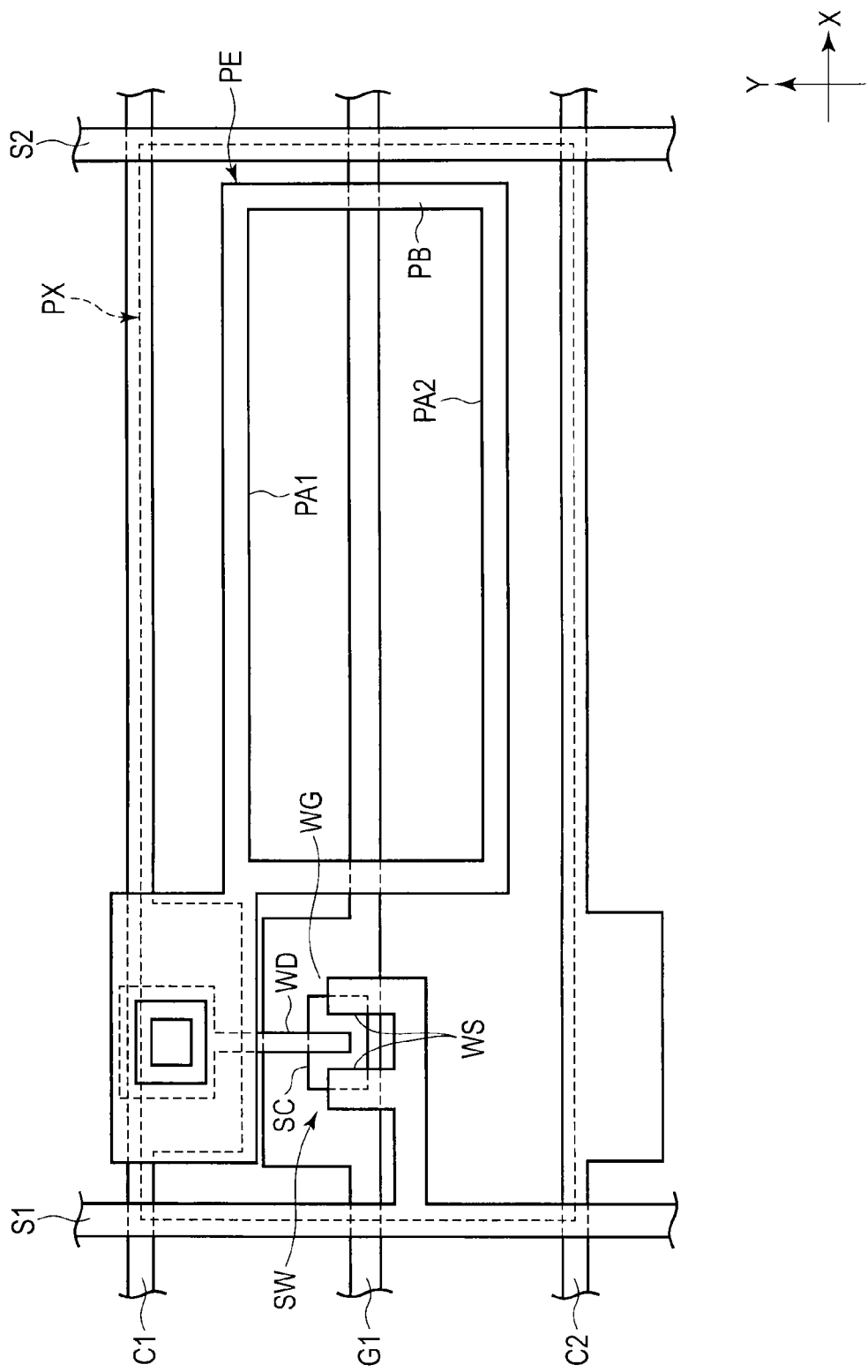
F I G. 13

_US 9,075,271 B2_

LIQUID CRYSTAL DISPLAY DEVICE

CROSS-REFERENCE TO RELATED APPLICATIONS

This application is based upon and claims the benefit of priority from Japanese Patent Applications No. 2011-194083, filed Sep. 6, 2011; and No. 2011-194087, filed Sep. 6, 2011, the entire contents of all of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 3 is a plan view which schematically shows a structure example of a pixel in a counter-substrate shown in FIG. 1.

FIG. 8 is a plan view which schematically shows another structure example of the pixel at a time when the array substrate shown in FIG. 1 is viewed from the counter-substrate side.

FIG. 10 is a plan view which schematically shows a structure example of the pixel in the counter-substrate shown in FIG. 1.

FIG. 13 is a plan view which schematically shows another structure example of the pixel at a time when the array substrate shown in FIG. 1 is viewed from the counter-substrate side.

DETAILED DESCRIPTION

Figure 1:
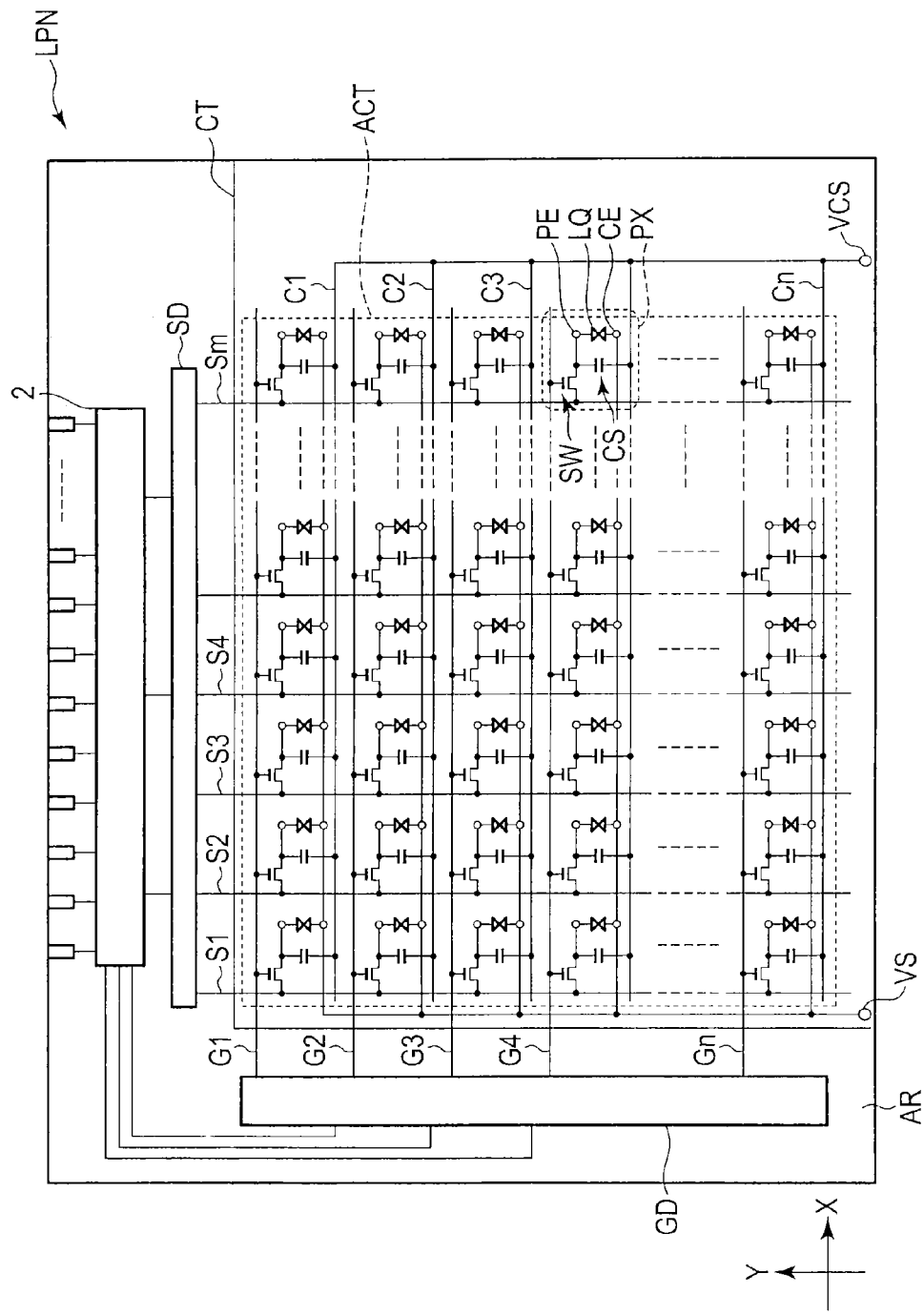
FIG. 1 is a view which schematically illustrates a structure and an equivalent circuit of a liquid crystal display device according to an embodiment.

In general, according to one embodiment, a liquid crystal display device includes a first substrate including a first gate line and a second gate line which extend in a first direction, a first source line and a second source line which extend in a second direction crossing the first direction, a switching element which is electrically connected to the first gate line and the first source line, and a pixel electrode which is located in an inside surrounded by the first gate line, the second gate line, the first source line and the second source line, the pixel electrode including a contact portion which is in contact with the switching element, two or more main pixel electrodes which extend in the first direction from the contact portion, and a connection portion which extends in the second direction and connects the main pixel electrodes; a second substrate including a common electrode including main common electrodes which are located above the first gate line, above the second gate line and above a point between the main pixel electrodes and extend in the first direction, and sub-common electrodes which are located above the first source line and above the second source line and extend in the second direction; and a liquid crystal layer including liquid crystal molecules held between the first substrate and the second substrate.

According to another embodiment, a liquid crystal display device includes a first substrate including a first gate line and a second gate line which extend in a first direction, a first source line and a second source line which extend in a second direction crossing the first direction, and a pixel electrode which is located in an inside surrounded by the first gate line, the second gate line, the first source line and the second source line and includes an electrode aperture portion extending in the first direction; a second substrate including a common electrode including main common electrodes which are located above the first gate line, above the second gate line and above the electrode aperture portion and extend in the first direction, and sub-common electrodes which are located above the first source line and above the second source line and extend in the second direction; and a liquid crystal layer including liquid crystal molecules held between the first substrate and the second substrate.

According to another embodiment, a liquid crystal display device includes a first substrate including a first gate line and a second gate line which extend in a first direction, a storage capacitance line which extends in the first direction between the first gate line and the second gate line, a first source line and a second source line which extend in a second direction crossing the first direction, and a pixel electrode which is located in an inside surrounded by the first gate line, the second gate line, the first source line and the second source line and includes two or more main pixel electrodes extending in the first direction, at least one of the main pixel electrodes being located above the storage capacitance line; a second substrate including a common electrode including main common electrodes which are located above the first gate line, above the second gate line and above a point between the main pixel electrodes and extend in the first direction, and sub-common electrodes which are located above the first source line and above the second source line and extend in the second direction; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C correspond to signal lines which extend, for example, substantially linearly in a first direction X. The gate lines G and storage capacitance lines C neighbor at intervals along a second direction Y crossing the first direction X, and are alternately arranged in parallel. In this example, the first direction X and the second direction Y are substantially perpendicular to each other. The source lines S cross the gate lines G and storage capacitance lines C. The source lines S correspond to signal lines which extend substantially linearly along the second direction Y. It is not always necessary that each of the gate lines G, storage capacitance lines C and source lines S extend linearly, and a part thereof may be bent.

Each of the gate lines G is led out to the outside of the active area ACT and is connected to a gate driver GD. Each of the source lines S is led out to the outside of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane, which is defined by the first direction X and second direction Y, or to a substrate major surface (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, amorphous silicon, but it may be formed of polysilicon.

The pixel electrodes PE are disposed in the respective pixels PX, and are electrically connected to the switching elements SW. The common electrode CE is disposed common to the pixel electrodes PE of plural pixels PX via the liquid crystal layer LQ. The pixel electrodes PE and common electrode CE are formed of a light-transmissive, electrically conductive material such as indium tin oxide (ITO) or indium zinc oxide (IZO). However, the pixel electrodes PE and common electrode CE may be formed of other metallic material such as aluminum.

The array substrate AR includes a power supply module VS for applying a voltage to the common electrode CE. The power supply module VS is formed, for example, on the outside of the active area ACT. The common electrode CE of the counter-substrate CT is led out to the outside of the active area ACT, and is electrically connected to the power supply module VS via an electrically conductive member (not shown).

Figure 2:
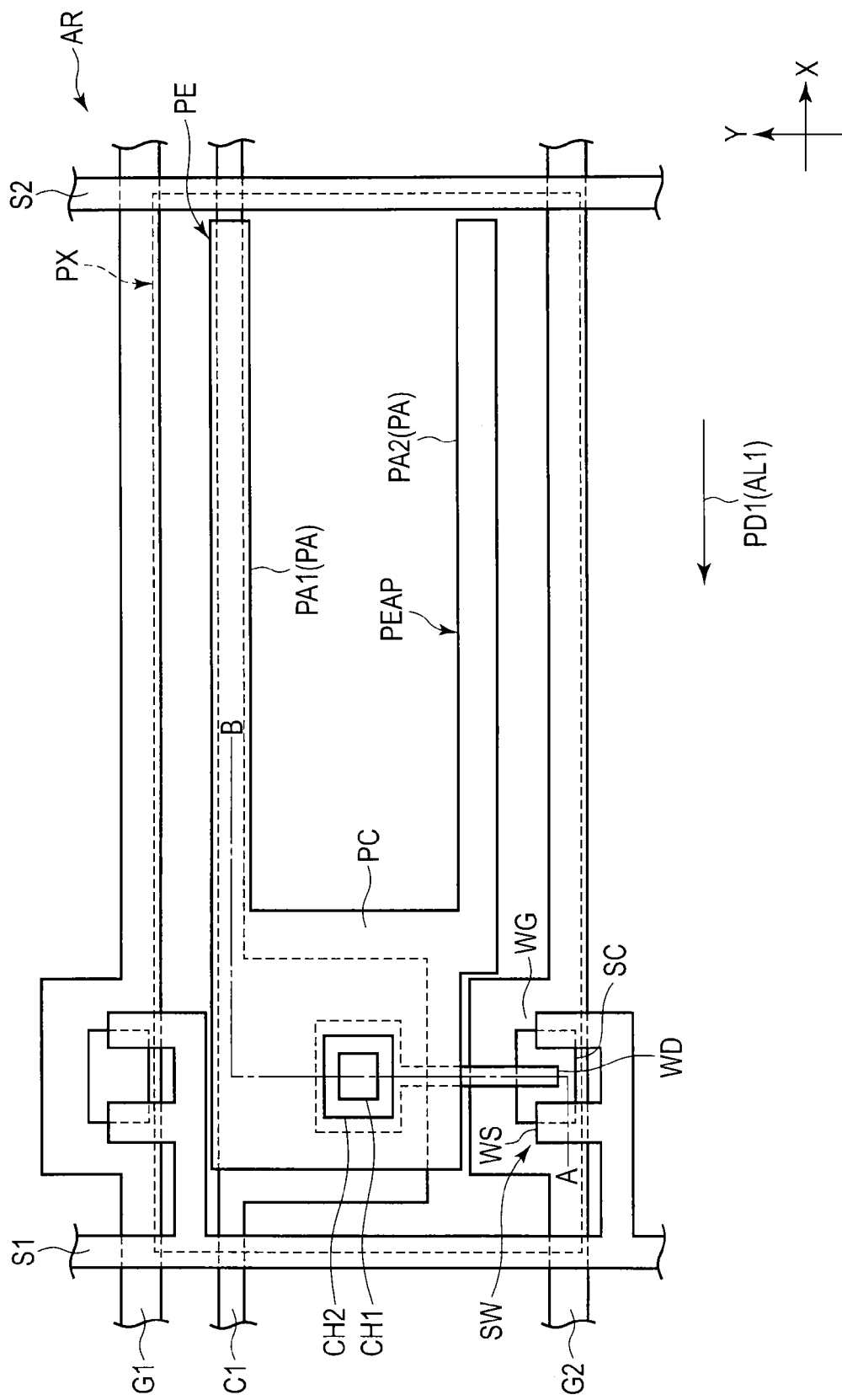
FIG. 2 is a plan view which schematically shows a structure example of a pixel at a time when an array substrate shown in FIG. 1 is viewed from a counter-substrate side.

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a first alignment film AL1.

In the example illustrated, as indicated by a broken line in FIG. 2, the pixel PX has a laterally elongated rectangular shape having a greater length in the first direction X than in the second direction Y. The gate line G1 and gate line G2 are disposed with a first pitch along the second direction Y, and each of the gate line G1 and gate line G2 extends in the first direction X. The storage capacitance line C1 is disposed between the gate line G1 and gate line G2, and extends in the first direction X. The source line S1 and source line S2 are disposed with a second pitch along the first direction X, and extend in the second direction Y.

In the pixel PX illustrated, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. Specifically, the length of the pixel PX in the first direction X corresponds to the second pitch between the source lines, and the length of the pixel PX in the second direction Y corresponds to the first pitch between the gate lines. The first pitch is less than the second pitch.

In addition, in the pixel PX illustrated, the storage capacitance line C1 is disposed with such an eccentricity as to be closer to the gate line G1 than to the gate line G2. Specifically, the distance in the second direction Y between the storage capacitance line C1 and the gate line G1 is less than the distance in the second direction Y between the storage capacitance line C1 and the gate line G2.

The switching element SW, in the illustrated example, is electrically connected to the gate line G2 and source line S1. The switching element SW is provided in the vicinity of an intersection between the gate line G2 and source line S1, in particular, in a region between the storage capacitance line C1 and gate line G2. The switching element SW includes a gate electrode WG which is formed integral with the gate line G2, a semiconductor layer SC which is formed of amorphous silicon immediately above the gate electrode WG, a source electrode WS which is formed integral with the source line S1 and is put in contact with the semiconductor layer SC, and a drain electrode WD which is put in contact with the semiconductor layer SC.

The pixel electrode PE is disposed between the source line S1 and source line S2 which neighbor each other, and between the gate line G1 and gate line G2. Specifically, the pixel electrode PE is located within an inside surrounded by the source line S1, source line S2, gate line G1 and gate line G2. The pixel electrode PE is electrically connected to the switching element SW and drain electrode WD via a contact hole CH1 and a contact hole CH2.

The pixel electrode PE includes a main pixel electrode PA and a contact portion PC. The main pixel electrode PA and contact portion PC are electrically connected to each other.

The contact portion PC is put in contact with the switching element SW. Specifically, the contact portion PC is located immediately above the drain electrode WD that extends from the switching element SW, or immediately above the storage capacitance line C1. The contact portion PC is electrically connected to the drain electrode WD of the switching element SW via the contact hole CH1 and contact hole CH2.

One pixel electrode PE includes two or more main pixel electrodes PA. Each of the main pixel electrodes PA extends in the first direction X from the contact portion PC. Specifically, a plurality of main pixel electrodes PA are formed in a comb shape and are branched from the contact portion PC. Each of the main pixel electrodes PA is formed in a strip shape with a substantially uniform width in the second direction Y.

The pixel electrode PE includes an electrode aperture portion PEAP which is defined by two neighboring main pixel electrodes PA and the contact portion PC. The electrode aperture portion PEAP extends in the first direction X.

In the example illustrated, the pixel electrode PE includes two main pixel electrodes, namely a main pixel electrode PA1 and a main pixel electrode PA2. The contact portion PC is located near the left side end portion of the pixel PX (i.e. on the side near the source line S1) and is electrically connected to the switching element SW. Each of the main pixel electrode PA1 and main pixel electrode PA2 linearly extends in the first direction X from the contact portion PC toward the right side end portion of the pixel PX (i.e. toward the source line S2). Each of the main pixel electrode PA1 and main pixel electrode PA2 is formed in a strip shape with a substantially uniform width in the second direction Y. The electrode aperture portion PEAP is formed in an inside surrounded by the main pixel electrode PA1, main pixel electrode PA2, contact portion PC and source line S2, and has a rectangular shape with long sides along the first direction X.

At least one of the plural main pixel electrodes PA is located above the storage capacitance line C1. In the example illustrated, the main pixel electrode PA1 is located above the storage capacitance line C1. Specifically, the pixel electrode PE is opposed to the storage capacitance line C1 at the contact portion PC and main pixel electrode PA1, thereby producing a capacitance that is necessary for image display in the pixel PX.

In the meantime, the array substrate AR may further includes a part of the common electrode CE.

In the array substrate AR, the pixel electrode PE is covered with the first alignment film AL1. The first alignment film AL1 is subjected to alignment treatment (e.g. rubbing treatment or optical alignment treatment) in a first alignment treatment direction PD1 for initially aligning the liquid crystal molecules of the liquid crystal layer LQ. The first alignment treatment direction PD1, in which the first alignment film AL1 initially aligns the liquid crystal molecules, is substantially parallel to the first direction X that is the direction of extension of the main pixel electrodes PA.

Examples of dimensions are described. The first pitch of gate lines G, i.e. the distance between the gate line G1 and gate line G2 in the second direction Y, is 50 μm to 60 μm. The second pitch of source lines S, i.e. the distance between the source line S1 and source line S2 in the first direction X, is 150 μm to 180 μm. The width of each of the gate line G and storage capacitance line C in the second direction Y is 5 μm. The width of the main pixel electrode in the second direction Y is 5 μm. The width of the source line S in the first direction X is 3 μm. In the meantime, the gate line G and storage capacitance line C are formed in the same layer and need to be electrically insulated, and therefore a margin of, e.g. 10 μm is secured therebetween.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and the pixel electrode PE, source lines S and gate lines G, which are provided on the array substrate, are indicated by broken lines.

The common electrode CE includes a main common electrode CA on the counter-substrate CT. In the example illustrated, the common electrode CE further includes a sub-common electrode CB on the counter-substrate CT. The main common electrode CA and sub-common electrode CB are electrically connected to each other. The sub-common electrode CB, however, may be omitted.

In the X-Y plane, the main common electrode CA is located on both sides of each of the main pixel electrode PA1 and main pixel electrode PA2, and linearly extends in the first direction X that is substantially parallel to the direction of extension of the main pixel electrode PA. Alternatively, main common electrodes CA are disposed, respectively, above the gate lines G and above a point between the main pixel electrodes PA, and extend in the first direction X that is substantially parallel to the direction of extension of the main pixel electrodes PA. Alternatively, the main common electrodes CA are disposed, respectively, above the gate lines G and above the electrode aperture portion PEAP of the pixel electrode PE, and extend in the first direction X that is substantially parallel to the direction of extension of the main pixel electrodes PA. The main common electrode CA is formed in a strip shape with a substantially uniform width in the second direction Y.

In the example illustrated, three main common electrodes CA are arranged in parallel at intervals in the second direction Y. Specifically, in each pixel, three main common electrodes CA are arranged with equal pitches in the second direction Y. In the pixel PX, a main common electrode CAU is disposed at an upper side end portion, a main common electrode CAB is disposed at a lower side end portion, and a main common electrode CAC is disposed at a central portion of the pixel. Strictly speaking, the main common electrode CAU is disposed to extend over a boundary between the pixel PX and a pixel neighboring on the upper side, and the main common electrode CAB is disposed to extend over a boundary between the pixel PX and a pixel neighboring on the lower side. The main common electrode CAU is located above the gate line G1, the main common electrode CAB is located above the gate line G2, and the main common electrode CAC crosses the center of the electrode aperture portion PEAP.

The main common electrode CAU and main common electrode CAC are located on both sides of the main pixel electrode PA1. Similarly, the main common electrode CAC and main common electrode CAB are located on both sides of the main pixel electrode PA2. In other words, the main common electrode CAC, which is disposed at the center of the pixel, is located at a substantially middle point between the main pixel electrode PA1 and main pixel electrode PA2. Specifically, in the X-Y plane, the main common electrodes CA and main pixel electrodes PA are alternately arranged in the second direction Y. In the example illustrated, the main common electrode CAU, main pixel electrode PA1, main common electrode CAC, main pixel electrode PA2 and main common electrode CAB are arranged in the named order. In the meantime, it is desirable that the inter-electrode distance in the second direction Y between the main common electrode CAU and main pixel electrode PA1, the inter-electrode distance in the second direction Y between the main pixel electrode PA1 and main common electrode CAC, the inter-electrode distance in the second direction Y between the main common electrode CAC and main pixel electrode PA2, and the inter-electrode distance in the second direction Y between the main pixel electrode PA2 and main common electrode CAB be substantially equal.

The sub-common electrode CB linearly extends, in the X-Y plane, in the second direction Y on both sides of the pixel electrode PE. Alternatively, the sub-common electrodes CB are located, respectively, above the source lines S, and linearly extend in the second direction Y. The sub-common electrode CB is formed in a strip shape with a substantially uniform width in the first direction X. In addition, the sub-common electrode CB is formed integral or continuous with the main common electrode CA, and is electrically connected to the main common electrode CA. Specifically, in the counter-substrate CT, the common electrode CE is formed in a grid shape.

In the example illustrated, two sub-common electrodes CB are arranged in parallel with a distance in the first direction X, and are disposed at both left and right end portions of the pixel PX. Specifically, in each pixel, two sub-common electrodes CB are disposed. In the pixel PX illustrated, a sub-common electrode CBL is disposed at a left side end portion, and a sub-common electrode CBR is disposed at a right side end portion. Strictly speaking, the sub-common electrode CBL is disposed over a boundary between the pixel PX and a pixel neighboring on the left side, and the sub-common electrode CBR is disposed to extend over a boundary between the pixel PX and a pixel neighboring on the right side. The sub-common electrode CBL is located above the source line S1, and the sub-common electrode CBR is located above the source line S2.

In the counter-substrate CT, the common electrode CE is covered with a second alignment film AL2. The second alignment film AL2 is subjected to alignment treatment (e.g. rubbing treatment or optical alignment treatment) in a second alignment treatment direction PD2 for initially aligning the liquid crystal molecules of the liquid crystal layer LQ. The second alignment treatment direction PD2, in which the second alignment film AL2 initially aligns the liquid crystal molecules, is parallel to the first alignment treatment direction PD1, and is identical or opposite to the first alignment treatment direction PD1. In the example illustrated, the second alignment treatment direction PD2 is parallel to the first direction X, and is parallel and identical to the first alignment treatment direction PD1 in the X-Y plane.

As shown in FIG. 3, an aperture portion AP, which is formed by a black matrix, has a rectangular shape having a greater length in the first direction X than in the second direction Y. In other words, the black matrix is located above the gate line G1, gate line G2, source line S1, source line S2, switching element SW, and contact portion PC of the pixel electrode PE.

Figure 4:
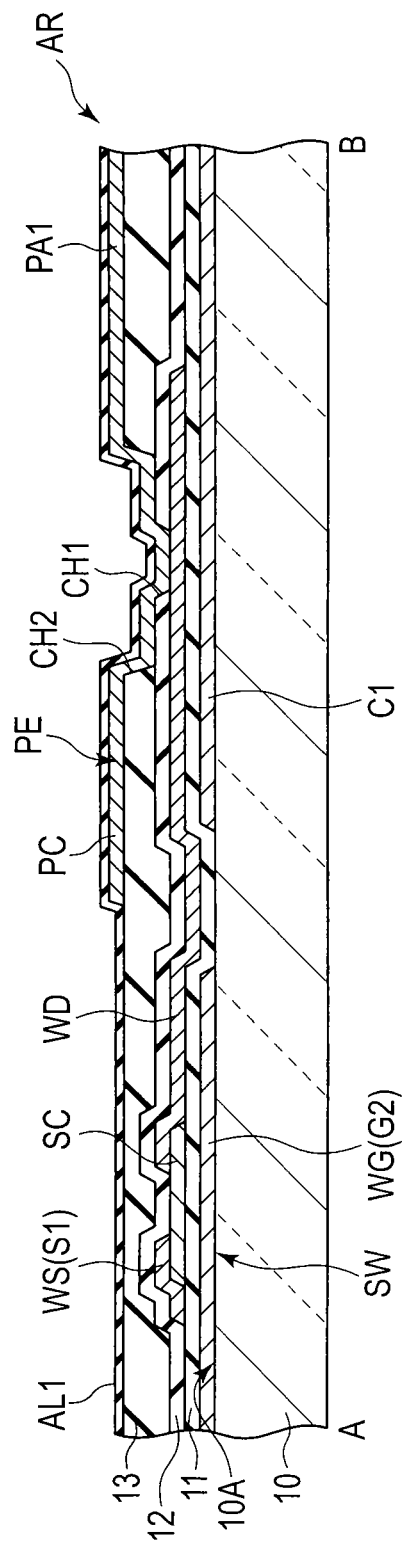
FIG. 4 is a schematic cross-sectional view, taken along line A-B in FIG. 2, showing a cross-sectional structure of the array substrate shown in FIG. 2.

FIG. 4 is a schematic cross-sectional view, taken along line A-B in FIG. 2, showing a cross-sectional structure of the array substrate AR shown in FIG. 2.

The array substrate AR is formed by using a first insulative substrate 10 having light transmissivity. The array substrate AR includes, on the first insulative substrate 10, a switching element SW, a storage capacitance line C1, a pixel electrode PE, a first insulation film 11, a second insulation film 12, a third insulation film 13, and a first alignment film AL1.

A gate electrode WG of the switching element SW is a part of the gate line G2, and is formed on an inner surface 10A of the first insulative substrate 10. The storage capacitance line C1 is formed on the inner surface 10A of the first insulative substrate 10. The gate electrode WG and storage capacitance line C1 are covered with the first insulation film 11.

A semiconductor layer SC of the switching element SW is formed on the first insulation film 11 and is located immediately above the gate electrode WG. A source electrode WS of the switching element SW is a part of the source line S1, is formed on the first insulation film 11, and is put in contact with the semiconductor layer SC. A drain electrode WD of the switching element SW is formed on the first insulation film 11 and is put in contact with the semiconductor layer SC. The semiconductor layer SC, source electrode WS and drain electrode WD are covered with the second insulation film 12. A contact hole CH1, which penetrates to the drain electrode WD, is formed in the second insulation film 12.

The third insulation film 13 is formed on the second insulation film 12. A contact hole CH2 is formed in the third insulation film 13. The contact hole CH2 has a greater size than the contact hole CH1, penetrates to the drain electrode WD in the contact hole CH1, and penetrates to the second insulation film 12 at the periphery of the contact hole CH1.

The pixel electrode PE is formed on the third insulation film 13, and the contact portion PC thereof is put in contact with the drain electrode WD via the contact hole CH1 and contact hole CH2. A part of the pixel electrode PE (e.g. main pixel electrode PA1) is opposed to the storage capacitance line C1 via the first insulation film 11, second insulation film 12 and third insulation film 13.

The first alignment film AL1 covers the pixel electrode PE, etc., and is also disposed over the third insulation film 13. The first alignment film AL1 is formed of a material which exhibits horizontal alignment properties.

Figure 5:
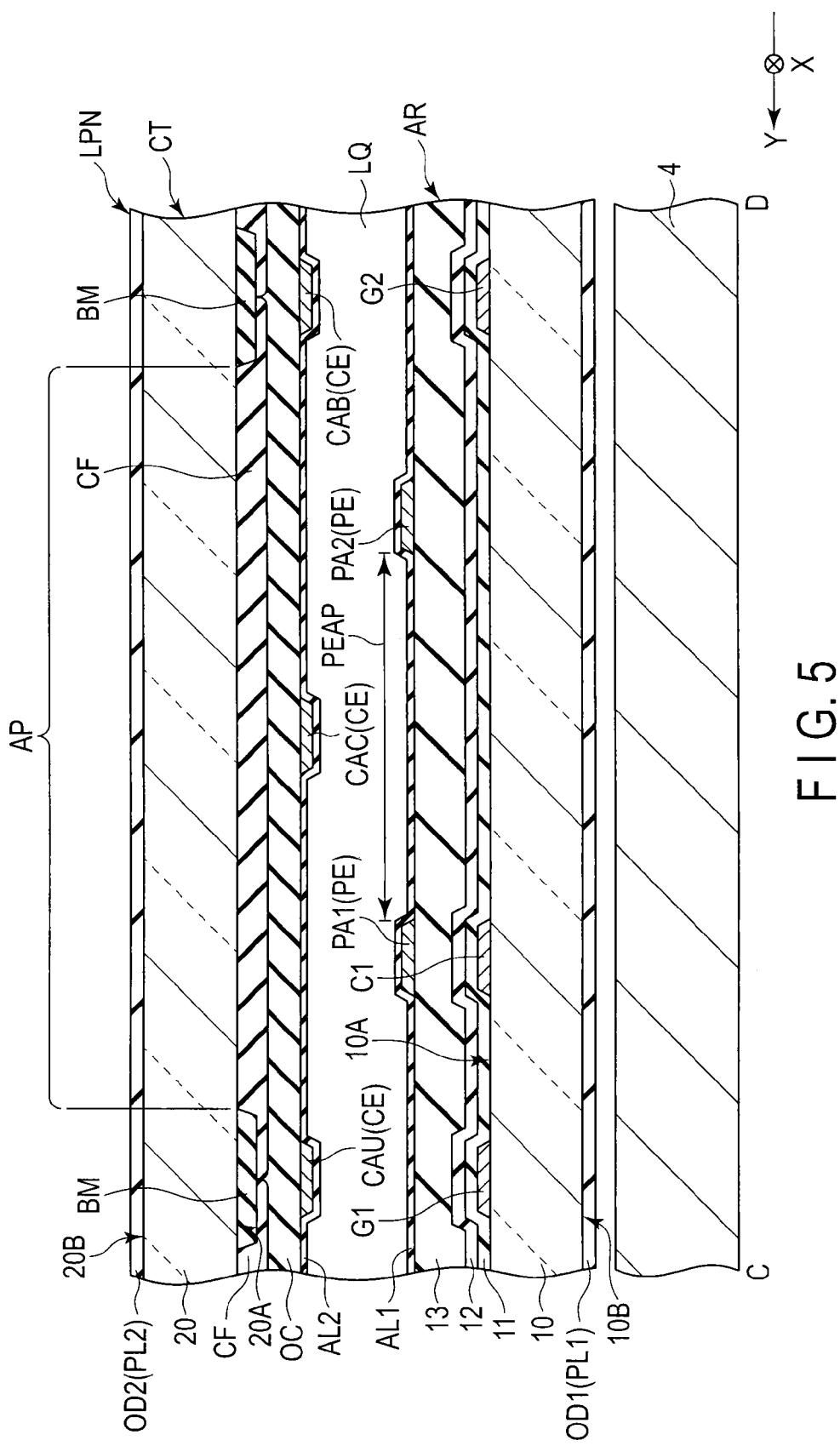
FIG. 5 is a schematic cross-sectional view, taken along line C-D in FIG. 3, showing a cross-sectional structure of a liquid crystal display panel shown in FIG. 3.

FIG. 5 is a schematic cross-sectional view, taken along line C-D in FIG. 3, showing a cross-sectional structure of the liquid crystal display panel LPN shown in FIG. 3.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

In the array substrate AR, the gate line G1, storage capacitance line C1 and gate line G2 are formed on the inner surface 10A of the first insulative substrate 10, that is, on the side thereof facing the counter-substrate CT, and is covered with the first insulation film 11. The main pixel electrode PA1 and main pixel electrode PA2 of the pixel electrode PE are formed on the third insulation film 13 and are covered with the first alignment film AL1. The main pixel electrode PA1 and main pixel electrode PA2 are located on the inside of positions immediately above the gate line G1 and gate line G2. An electrode aperture portion PEAP is formed between the main pixel electrode PA1 and main pixel electrode PA2. The main pixel electrode PA1 is located immediately above the storage capacitance line C1. The first insulation film 11, second insulation film 12 and third insulation film 13 are interposed between the main pixel electrode PA1 and the storage capacitance line C1. The first alignment film AL1 is disposed on that surface of the array substrate AR, which is opposed to the counter-substrate CT, and the first alignment film AL1 extends over substantially the entirety of the active area ACT.

The counter-substrate CT is formed by using a second insulative substrate 20 having light transmissivity. The counter-substrate CT includes, on the inside of the second insulative substrate 20, that is, on the side thereof facing the array substrate AR, a black matrix BM, a color filter CF, an overcoat layer OC, a common electrode CE, and a second alignment film AL2.

The black matrix BM partitions the pixels PX and forms an aperture portion AP. Specifically, the black matrix BM is disposed so as to be opposed to wiring portions, such as the source lines S, gate lines G, storage capacitance lines C and switching elements SW. In the example illustrated, the black matrix BM includes portions which are located above the gate line G1 and gate line G2, and portions which are located above the switching element SW, source line S1 and source line S2 (not shown), and the black matrix BM is formed in a grid shape. The black matrix BM is disposed on an inner surface 20A of the second insulative substrate 20, which is opposed to the array substrate AR.

The color filter CF is disposed in association with each pixel PX. Specifically, the color filter CF is disposed in an inside area partitioned by the black matrix BM on the inner surface 20A of the second insulative substrate 20, and a part of the color filter CF extends over the black matrix BM. Color filters CF, which are disposed in the pixels PX neighboring in the second direction Y, have mutually different colors. For example, the color filters CF are formed of resin materials which are colored in three primary colors of red, blue and green. A red color filter, which is formed of a resin material colored in red, is disposed in association with a red pixel. A blue color filter, which is formed of a resin material colored in blue, is disposed in association with a blue pixel. A green color filter, which is formed of a resin material colored in green, is disposed in association with a green pixel. Boundaries between these color filters CF are located at positions overlapping the black matrix BM.

The overcoat layer OC covers the color filters CF. The overcoat layer OC reduces the effect of asperities on the surfaces of the color filters CF. The overcoat layer OC is formed of a transparent resin material.

The main common electrode CAU, main common electrode CAC and main common electrode CAB of the common electrode, and the sub-common electrode CB (not shown) are formed on that side of the overcoat layer OC, which is opposed to the array substrate AR. In particular, the main common electrode CAU, main common electrode CAB, and the sub-common electrode CB (not shown) are located immediately below the black matrix BM. The main common electrode CAU is located immediately above the gate line G1, and the main common electrode CAB is located immediately above the gate line G2. The main common electrode CAC is located between the main common electrode CAU and main common electrode CAB, and is located immediately above the electrode aperture portion PEAP. None of the main pixel electrodes or none of the gate lines is located immediately below the main common electrode CAC.

In the aperture portion AP, the regions between the pixel electrode PE and the common electrode CE, namely a region between the main common electrode CAU and main pixel electrode PA1, a region between the main common electrode CAC and main pixel electrode PA1, a region between the main common electrode CAC and main pixel electrode PA2, and a region between the main common electrode CAB and main pixel electrode PA2, correspond to transmissive regions through which light can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE and overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is composed of a liquid crystal material having a positive (positive-type) dielectric constant anisotropy.

Incidentally, the distance in the second direction Y between the main pixel electrode PA and the main common electrode CA is greater than the thickness of the liquid crystal layer LQ, and is more than double the thickness of the liquid crystal layer LQ.

A first optical element OD1 is attached by, e.g. an adhesive, to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed such that the polarization axis thereof is substantially parallel or substantially perpendicular to the direction of extension of the main pixel electrode PA or main common electrode CA. Specifically, when the direction of extension of the main pixel electrode PA or main common electrode CA is the first direction X, the polarization axis of one of the polarizers is substantially parallel to the first direction X, or is substantially perpendicular to the first direction X. Alternatively, one of the polarizers is disposed such that the polarization axis thereof is parallel or perpendicular to the direction of initial alignment of liquid crystal molecules, that is, the first alignment treatment direction PD1 or second alignment treatment direction PD2. When the initial alignment direction is parallel to the first direction X, the polarization axis of one polarizer is parallel to the first direction X or is parallel to the second direction Y.

In an example shown in part (a) of FIG. 3, the first polarizer PL1 is disposed such that the first polarization axis AX1 thereof is parallel to the first direction X, and the second polarizer PL2 is disposed such that the second polarization axis AX2 thereof is parallel to the second direction Y. In addition, in an example shown in part (b) of FIG. 3, the second polarizer PL2 is disposed such that the second polarization axis AX2 thereof is parallel to the first direction X, and the first polarizer PL1 is disposed such that the first polarization axis AX1 thereof is parallel to the second direction Y.

Next, the operation of the liquid crystal display panel LPN having the above-described structure is described with reference to FIG. 2 to FIG. 5.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane. In this example, each of the first alignment treatment direction PD1 and the second alignment treatment direction PD2 is substantially parallel to the first direction X. At the OFF time, the liquid crystal molecule LM is initially aligned such that the major axis thereof is substantially parallel to the first direction X, as indicated by a broken line in FIG. 3.

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved. In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1, becomes linearly polarized light which is perpendicular to the first polarization axis AX1, and enters the liquid crystal display panel LPN. The polarization state of such linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is substantially parallel to the X-Y plane, as indicated by solid lines in the Figure.

In the example shown in FIG. 3, in the pixel PX, the liquid crystal molecule LM in the region between the main pixel electrode PA1 and main common electrode CAC mainly rotates counterclockwise relative to the first direction X, and is aligned in a lower left direction in the Figure. In addition, the liquid crystal molecule LM in the region between the main pixel electrode PA2 and main common electrode CAC mainly rotates clockwise relative to the first direction X, and is aligned in an upper left direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the main pixel electrodes PA or at positions overlapping the main common electrodes CA, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, becomes linearly polarized light which is perpendicular to the first polarization axis AX1, and enters the liquid crystal display panel LPN. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules LM which are aligned in a 45°-225° azimuth direction or a 135°-315° azimuth direction relative to the first direction X ($\lambda$ is a wavelength of light passing through the liquid crystal layer LQ). Thereby, the polarization state of the light, which has passed through the liquid crystal layer LQ, becomes linear polarization parallel to the second direction Y. Thus, at the ON time, at least part of the light emerging from the liquid crystal layer LQ passes through the second polarizer PL2 (white display). However, at a position overlapping the pixel electrode or common electrode, since the liquid crystal molecules maintain the initial alignment state, black display is effected as in the case of the OFF time.

According to the present embodiment, the laterally elongated pixel structure is adopted, wherein the length in the first direction X, which is the direction of extension of the gate line and storage capacitance line, is greater than the length in the second direction Y, which is the direction of extension of the source line. Thereby, compared to a vertically elongated pixel structure wherein the length in the second direction Y is greater than the length in the first direction X, the total number of signal lines, such as gate lines, storage capacitance lines and source lines, can be reduced, despite the total number of pixels in the active area being the same.

In the active area ACT shown in FIG. 1, when the vertically elongated pixel structure is adopted, for example, the total number of source lines S is 2400 (m=2400), and the total number of gate lines G is 480 (n=480). On the other hand, when the laterally elongated pixel structure is adopted, the total number of source lines S is 800 (m=800) and the total number of gate lines G is 1440 (n=1440), and thus the number of signal lines can be reduced by 640.

In this manner, since the total number of signal lines can be reduced, the number of terminals of signal lines can be reduced and the scale of drivers for supplying signals to these signal lines can be reduced. Moreover, the number of driving IC chips, which are to be mounted in the liquid crystal display panel LPN, can be reduced. Therefore, cost reduction can be realized.

In addition, according to the embodiment, the pixel electrode PE, when viewed on the X-Y plane of one pixel, is disposed on the array substrate AR within the inside of the common electrode CE that is disposed on the counter-substrate CT. In other words, in one pixel PX, the pixel electrode PE is surrounded by the common electrode CE. By this arrangement, electric force lines have their starting point and end point within one pixel, and the electric force lines in this pixel do not leak to a neighboring pixel. Thus, for example, electric fields, which are applied to the liquid crystal layer LQ, do not affect each other between pixels PX which neighbor in the second direction Y. Therefore, the liquid crystal molecules LM in the pixel do not move due to the effect of the electric field from the neighboring pixel, and the degradation in display quality can be suppressed.

According to the present embodiment, a high transmittance can be obtained in the inter-electrode gap between the pixel electrode PE and the common electrode CE. In addition, a transmittance per pixel can be increased by increasing the inter-electrode distance between the main pixel electrode PA and the main common electrode CA. Besides, as regards product specifications in which the pixel pitch is different, for example, it is possible to make use of a peak condition of a transmittance distribution by varying the inter-electrode distance between the main pixel electrode PA and main common electrode CA. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch.

According to the present embodiment, in the region overlapping the black matrix BM, the transmittance is sufficiently lowered. The reason for this is that the electric field does not leak to the outside of the pixel from the positions of the common electrodes CE which are located immediately above the gate lines G and source lines S, and an undesired lateral electric field does not occur between pixels which neighbor each other with the black matrix BM interposed, and therefore the liquid crystal molecules LM in the region overlapping the black matrix BM keep the initial alignment state, like the case of the OFF time (or black display time). Accordingly, even when the colors of the color filters CF are different between pixels which neighbor each other with the gate line G or source line S interposed, the occurrence of color mixture can be suppressed, and the decrease in color reproducibility or the decrease in contrast ratio can be suppressed. In addition, when misalignment has occurred between the array substrate AR and the counter-substrate CT, a difference in inter-electrode distance between the pixel electrode PE and the common electrodes CE on both sides of the pixel electrode PE occurs commonly in all pixels PX. Thus, the electric field distribution does not differ between the pixels PX, and the influence on the display of images is very small.

According to the embodiment, a plurality of domains can be formed in one pixel. Therefore, a viewing angle can be optically compensated in plural directions, and the viewing angle can be increased.

The above-described example is directed to the case where the initial alignment direction of liquid crystal molecules LM is parallel to the first direction X. However, the initial alignment direction of liquid crystal molecules LM may be an oblique direction which obliquely crosses the first direction X and second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy.

Since a lateral electric field is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and common electrode CE do not necessarily need to be formed of a transparent, electrically conductive material, and may be formed of an opaque, electrically conductive material such as aluminum (Al), titanium (Ti), silver (Ag), molybdenum (Mo) or tungsten (W).

In the case where at least one of the pixel electrode PE and common electrode CE is formed of the above-described opaque, electrically conductive material, linearly polarized light, which has entered the liquid crystal display panel LPN, is substantially parallel or substantially perpendicular to the direction of extension of the edges of the pixel electrode PE or common electrode CE. In addition, the direction of extension of the gate line G, storage capacitance line C and source line S, which are formed of the above-described opaque, electrically conductive material, is substantially parallel or substantially perpendicular to the linearly polarized light which has entered the liquid crystal display panel LPN. Thus, the plane of polarization of the linearly polarized light, which is reflected by the edges of the pixel electrode PE or common electrode CE, the gate line G, storage capacitance line C and source line S, is hardly disturbed, and the plane of polarization at the time of passing through the first polarizer PL1, which is a polarizer, can be maintained. Accordingly, at the OFF time, since linearly polarized light, which has passed through the liquid crystal display panel LPN, is sufficiently absorbed by the second polarizer PL2, which is an analyzer, light leakage can be suppressed. Specifically, the transmittance can be sufficiently reduced at the time of black display, and the decrease in contrast ratio can be suppressed. In addition, since there is no need to increase the width of the black matrix BM in order to cope with light leakage in the vicinity of the pixel electrode PE or common electrode CE, it is possible to suppress a decrease in area of the aperture portion AP or a decrease in transmittance at the ON time.

Even at the ON time, little backlight passes over the pixel electrode PE or common electrode CE. Thus, even with the structure in which the main pixel electrode PA of the pixel electrode PE and the storage capacitance line C overlap in the aperture portion AP and a capacitance is produced, the area of the transmissive region in the aperture portion AP is not substantially reduced. Specifically, according to the embodiment in which the capacitance is produced by the main pixel electrode PA and storage capacitance line C, the capacitance that is necessary for display in the pixel PX can be secured, without decreasing the area of the transmissive region.

Since a part of the main common electrode CA is located above the gate line G that does not contribute to display, the area of the substantial transmissive region in the aperture portion AP is not decreased. In addition, since the contact portion PC of the pixel electrode PE is located outside the aperture portion AP, the area of the substantial transmissive region in the aperture portion AP is not decreased.

The above-described example relates to the structure in which one pixel electrode PE includes two main pixel electrodes PA. However, the structure is not limited to this example. When the number of main pixel electrodes PA, which are included in one pixel electrode PE, is a, the number of main common electrodes, which are disposed in one pixel, is (a+1), and one main pixel electrode PA is disposed between neighboring main common electrodes CA (a is a positive integer).

In the present embodiment, the structure of the pixel PX is not limited to the above-described example.

Figure 6:
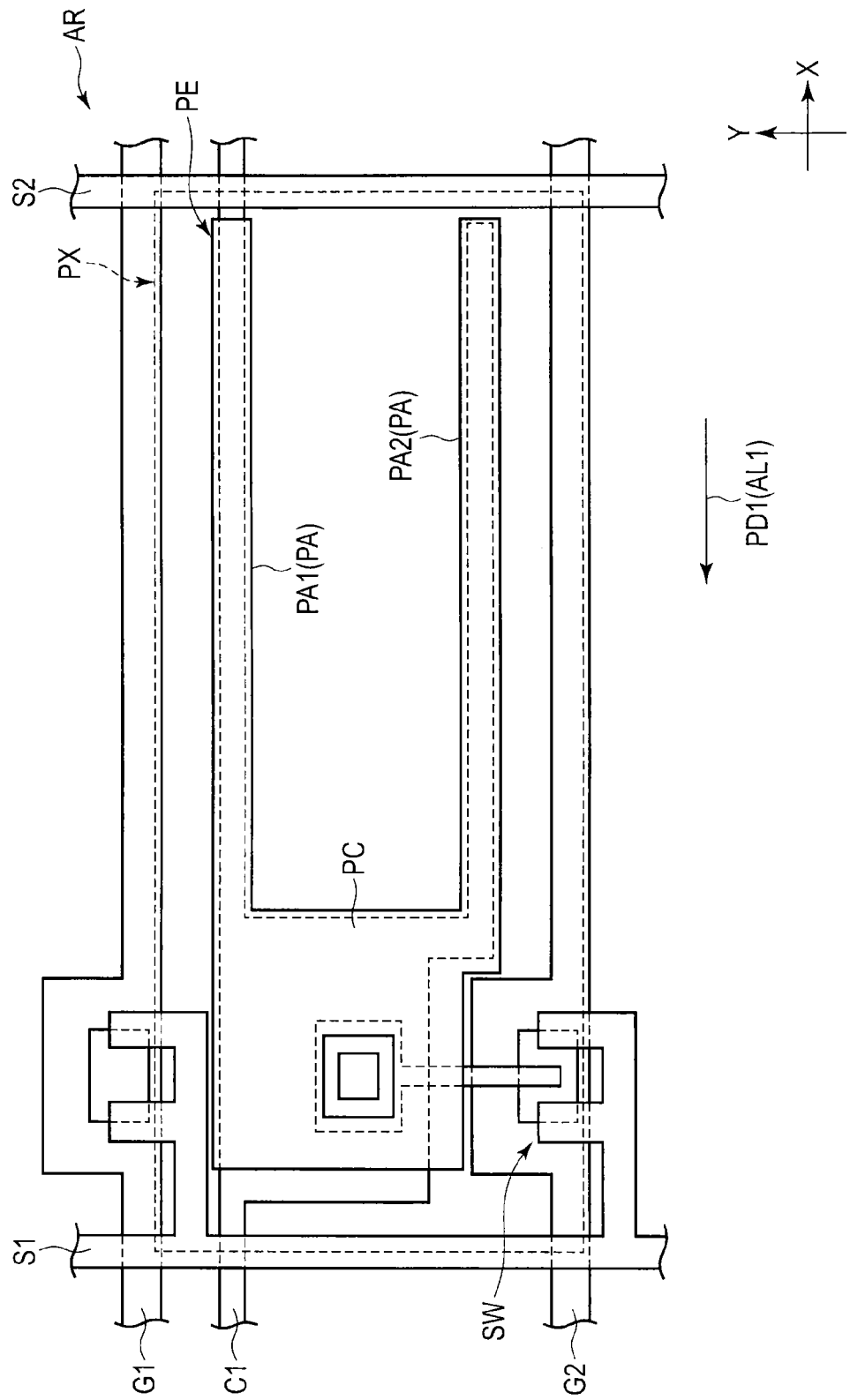
FIG. 6 is a plan view which schematically shows another structure example of the pixel at a time when the array substrate shown in FIG. 1 is viewed from the counter-substrate side.

FIG. 6 is a plan view which schematically shows another structure example of the pixel PX at a time when the array substrate AR shown in FIG. 1 is viewed from the counter-substrate side.

The structure example illustrated differs from the structure example shown in FIG. 2 in that a capacitance is produced not only between the storage capacitance line C1 and the main pixel electrode PA1, but also between the storage capacitance line C1 and the main pixel electrode PA2. Specifically, the storage capacitance line C1 is located immediately below the main pixel electrode PA1, and the storage capacitance line C1 is branched immediately below the contact portion PC, extends in the first direction X and is located immediately below the main pixel electrode PA2.

According to the structure example shown in FIG. 6, a greater capacitance than in the structure example shown in FIG. 2 can be produced, without decreasing the area of the transmissive region in the aperture portion AP.

Figure 7:
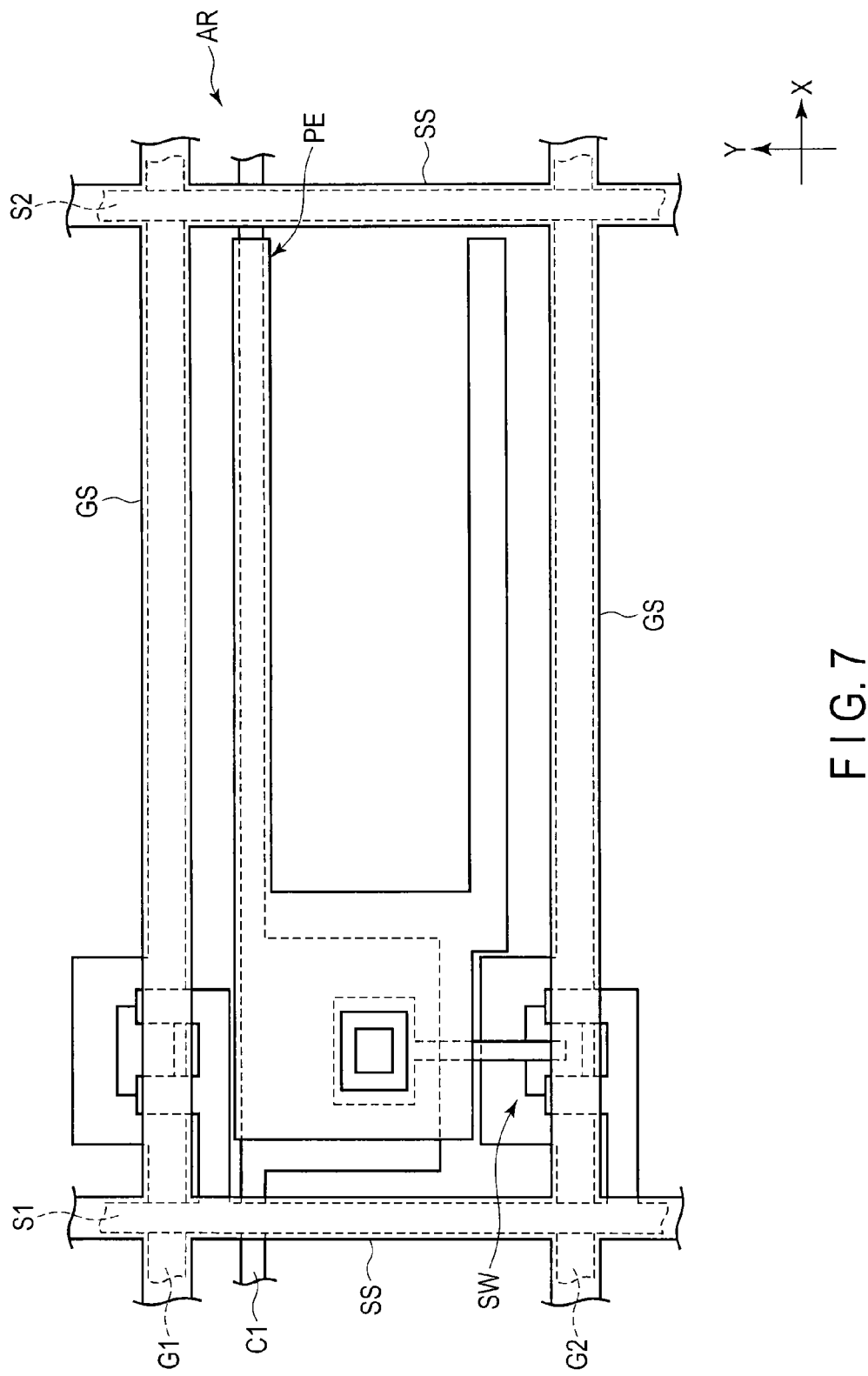
FIG. 7 is a plan view which schematically shows another structure example of the pixel at a time when the array substrate shown in FIG. 1 is viewed from the counter-substrate side.

FIG. 7 is a plan view which schematically shows another structure example of the pixel PX at a time when the array substrate AR shown in FIG. 1 is viewed from the counter-substrate side.

The structure example illustrated differs from the structure example shown in FIG. 2 in that the array substrate AR includes a gate shield electrode GS and a source shield electrode SS.

Specifically, the gate shield electrode GS is opposed to each of the gate line G1 and gate line G2. The gate shield electrode GS linearly extends in the first direction X, and is formed in a strip shape. The width of the gate shield electrode GS in the second direction Y may not necessarily be uniform. The gate shield electrode GS is electrically connected to the common electrode CE, and has the same potential as the common electrode CE.

The source shield electrode SS is opposed to each of the source line S1 and source line S2. The source shield line SS linearly extends in the second direction Y, and is formed in a strip shape. The width of the source shield electrode SS in the first direction X may not necessarily be uniform. The source shield electrode SS is electrically connected to the common electrode CE, and has the same potential as the common electrode CE. In the example illustrated, the gate shield electrode GS and source shield electrode SS are formed integral or continuous with each other. Specifically, in the array substrate AR, the pixel electrode PE is located in an inside area surrounded by the gate shield electrode GS and source shield electrode SS, which have the same potential as the common electrode CE.

Since the gate shield electrode GS and source shield electrode SS are formed on an upper surface of the third insulation film 13, that is, in the same layer as the pixel electrode PE, the gate shield electrode GS and source shield electrode SS can be formed of the same material (e.g. ITO) as the pixel electrode PE. However, the gate shield electrode GS and source shield electrode SS are spaced apart from the pixel electrode PE.

When the array substrate AR of this structure example is combined with the counter-substrate CT shown in FIG. 3, the gate shield electrode GS is opposed to the main common electrode CA, and the source shield electrode SS is opposed to the sub-common electrode CB.

According to the structure example shown in FIG. 7, since the gate shield electrode GS is opposed to the gate line G, an undesired electric field from the gate line G can be shielded. It is thus possible to suppress application of an undesired bias from the gate line G to the liquid crystal layer LQ, and to suppress the occurrence of a display defect such as burn-in, and the occurrence of light leakage due to an alignment defect of liquid crystal molecules.

Moreover, since the source shield electrode SS is opposed to the source line S, an undesired electric field from the source line S can be shielded. It is thus possible to suppress application of an undesired bias from the source line S to the liquid crystal layer LQ, and to suppress the occurrence of a display defect such as crosstalk (e.g. a phenomenon that when a pixel potential for displaying white is supplied to the source line that is connected to the pixel PX in the state in which the pixel PX is set at a pixel potential for displaying black, light leaks from a part of the pixel PX and the brightness increases).

Besides, since the gate shield electrode GS and source shield electrode SS, which are provided on the array substrate AR, are electrically connected and formed in a grid shape on the array substrate AR, redundancy can be improved. In addition, since the main common electrodes CA and sub-common electrodes CB, which are provided on the counter-substrate CT, are electrically connected and formed in a grid shape, redundancy can be improved. Since the gate shield electrode GS and source shield electrode SS and the main common electrodes CA and sub-common electrodes CB are electrically connected to each other, even if breakage occurs in a part of these electrodes, the common potential can stably be supplied to each pixel PX, and the occurrence of a display defect can be suppressed.

Needless to say, the above-described gate shield electrode GS and source shield electrode SS are applicable to the structure example shown in FIG. 6.

FIG. 8 is a plan view which schematically shows another structure example of the pixel PX at a time when the array substrate AR shown in FIG. 1 is viewed from the counter-substrate side.

The structure example illustrated differs from the structure example shown in FIG. 2 in that the gate line G is disposed at a substantially central part of the pixel PX.

Specifically, in each pixel PX, a storage capacitance line C1 is disposed at the upper side end portion, and a storage capacitance line C2 is disposed at the lower side end portion. Strictly speaking, the storage capacitance line C1 is disposed to extend over a boundary between the pixel PX and a pixel neighboring on the upper side, and the storage capacitance line C2 is disposed to extend over a boundary between the pixel PX and a pixel neighboring on the lower side. A gate line C1 is located between the storage capacitance line C1 and storage capacitance line C2. The switching element SW is electrically connected to the gate line G1 and the source line S1. The pixel electrode PE includes a main pixel electrode PA1 which is electrically connected to the switching element SW and is located between the gate line G1 and the storage capacitance line C1, and a main pixel electrode PA2 which is located between the gate line G1 and the storage capacitance line C2.

The array substrate AR of this structure example can be combined with the counter-substrate CT shown in FIG. 3. In this case, the main common electrode CAU is located above the storage capacitance line C1, the main common electrode CAC is located above the gate line G1, and the main common electrode CAB is located above the storage capacitance line C2.

Compared to the structure example shown in FIG. 2, the array substrate of the structure example shown in FIG. 8 is applicable to the case of such specifications that the capacitance, which is produced between the pixel electrode PE and the storage capacitance line C1, is relatively small.

Next, other modes of the present embodiment are additionally described.

(1) A liquid crystal display device including:
a first substrate including a gate line extending in a first direction, a source line extending in a second direction crossing the first direction, and a pixel electrode which is disposed in a pixel having a greater length in the first direction than in the second direction and includes a main pixel electrode extending in the first direction;
a second substrate including a common electrode including main common electrodes extending in the first direction on both sides of the main pixel electrode; and
a liquid crystal layer including liquid crystal molecules held between the first substrate and the second substrate.

(2) The liquid crystal display device according to (1), wherein the first substrate further includes a storage capacitance line extending in the first direction, the storage capacitance line and the gate line being alternately arranged in parallel, and a capacitance being produced between the storage capacitance line and the pixel electrode.

(3) The liquid crystal display device according to (2), wherein the pixel electrode is located between the gate lines which neighbor each other, and the main pixel electrode is located above the storage capacitance line.

(4) The liquid crystal display device according to (3), wherein the main common electrodes are located, respectively, above the gate lines and between the main pixel electrodes.

(5) A liquid crystal display device including:
a first substrate including a first gate line and a second gate line each extending in a first direction, a storage capacitance line extending in the first direction between the first gate line and the second gate line, a source line extending in a second direction crossing the first direction, and a pixel electrode including two or more main pixel electrodes extending in the first direction between the first gate line and the second gate line, at least one of the main pixel electrodes being located above the storage capacitance line;
a second substrate including a common electrode including main common electrodes extending in the first direction on both sides of the main pixel electrode; and
a liquid crystal layer including liquid crystal molecules held between the first substrate and the second substrate.

(6) The liquid crystal display device according to (5), wherein the pixel electrode is disposed in a pixel having a greater length in the first direction than in the second direction.

(7) The liquid crystal display device according to (5) or (6), wherein any one of the main common electrodes is located above each of the gate lines.

(8) The liquid crystal display device according to any one of (1) to (7), the second substrate further including sub-common electrodes extending in the second direction above the source lines.

Next, still other structure examples of the embodiment are described.

Figure 9:
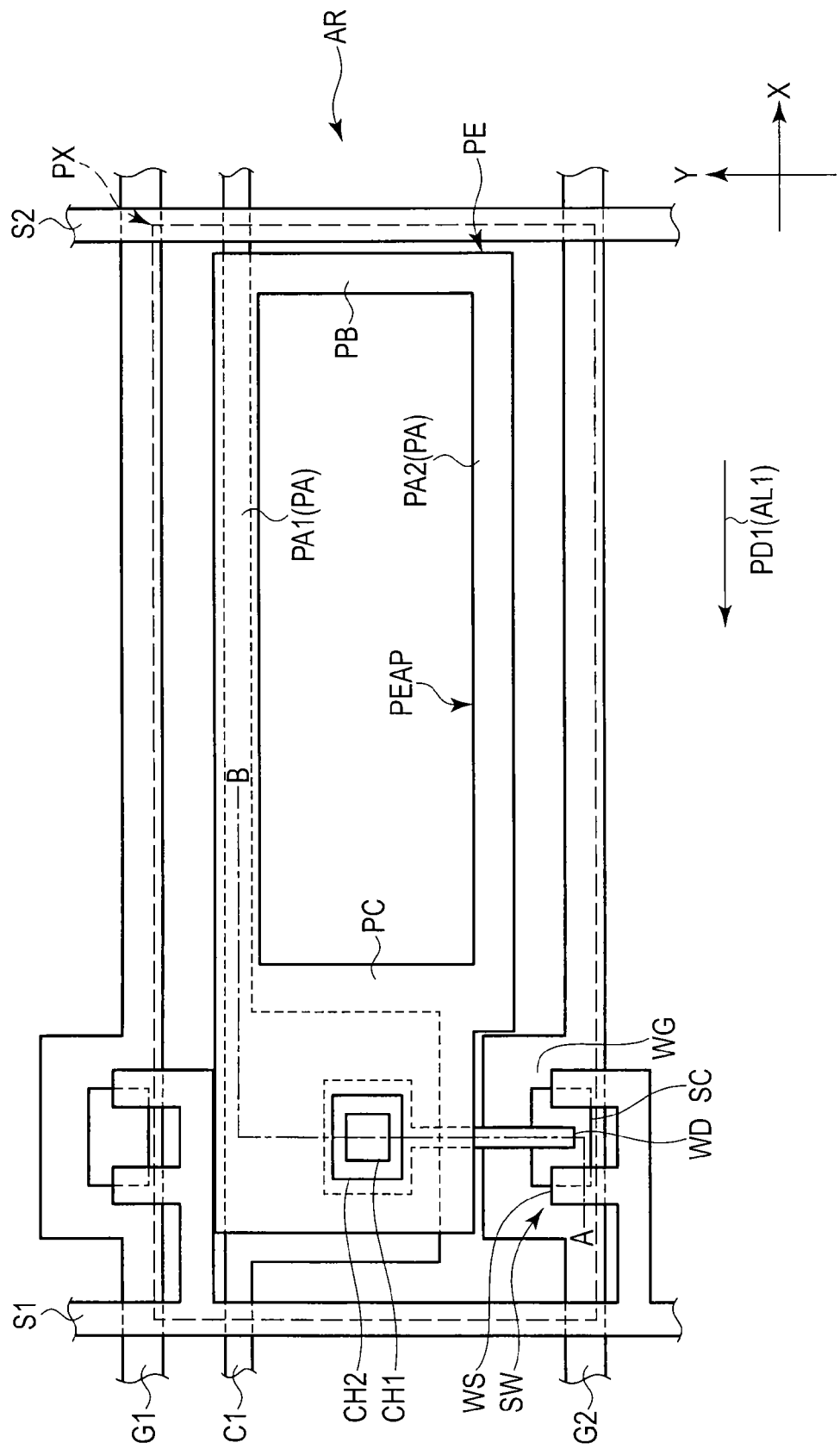
FIG. 9 is a plan view which schematically shows another structure example of the pixel at a time when the array substrate shown in FIG. 1 is viewed from the counter-substrate side.

FIG. 9 is a plan view which schematically shows another structure example of the pixel PX at a time when the array substrate AR shown in FIG. 1 is viewed from the counter-substrate side.

The structure example illustrated differs from the structure example shown in FIG. 2 in that the pixel electrode PE is formed in a loop shape.

The pixel electrode PE includes main pixel electrodes PA, a contact portion PC and a connection portion PB. The main pixel electrodes PA, contact portion PC and connection portion PB are electrically connected. The main pixel electrodes PA and contact portion PC are as have been described with reference to FIG. 2. The connection portion PB extends in the second direction Y, and connects the main pixel electrodes PA. The connection portion PB is formed in a strip shape with a substantially uniform width in the first direction X.

This pixel electrode PE includes an electrode aperture portion PEAP which is defined by the neighboring main pixel electrode PA1 and main pixel electrode PA2, the contact portion PC and the connection portion PB. The electrode aperture portion PEAP extends in the first direction X. In other words, the pixel electrode PE is formed in a substantially rectangular loop shape. Alternatively, the main pixel electrode PA1, main pixel electrode PA2, contact portion PC and connection portion PB, which define the electrode aperture portion PEAP, form a loop.

In the example illustrated, the connection portion PB connects distal end portions of the main pixel electrode PA1 and main pixel electrode PA2, which are closest to the source line S2. The electrode aperture portion PEAP, which is formed in the pixel electrode PE, has a rectangular shape having a greater length in the first direction X than in the second direction Y.

According to the structure example shown in FIG. 9, since the pixel electrode PE is formed in the loop shape, redundancy can be improved. Specifically, even if breakage occurs in a part of the pixel electrode PE, the pixel potential can be supplied to each of the main pixel electrodes PA via a path extending through the contact portion PC or a path extending through the connection portion PB. In particular, when a demand for higher fineness further increases, the width of the main pixel electrode PA will become extremely small, and breakage will easily occur in a part of the main pixel electrode PA. For example, even if breakage occurs in the main pixel electrode PA2, since the main pixel electrode PA1 and main pixel electrode PA2 are connected via the contact portion PC and connection portion PB, the pixel potential can be supplied to both the main pixel electrode PA1 and main pixel electrode PA2.

Besides, as shown in FIG. 10, since the contact portion PC and connection portion PB are located outside the aperture portion AP, the area of the substantial transmissive region in the aperture portion AP is not decreased.

Figure 11:
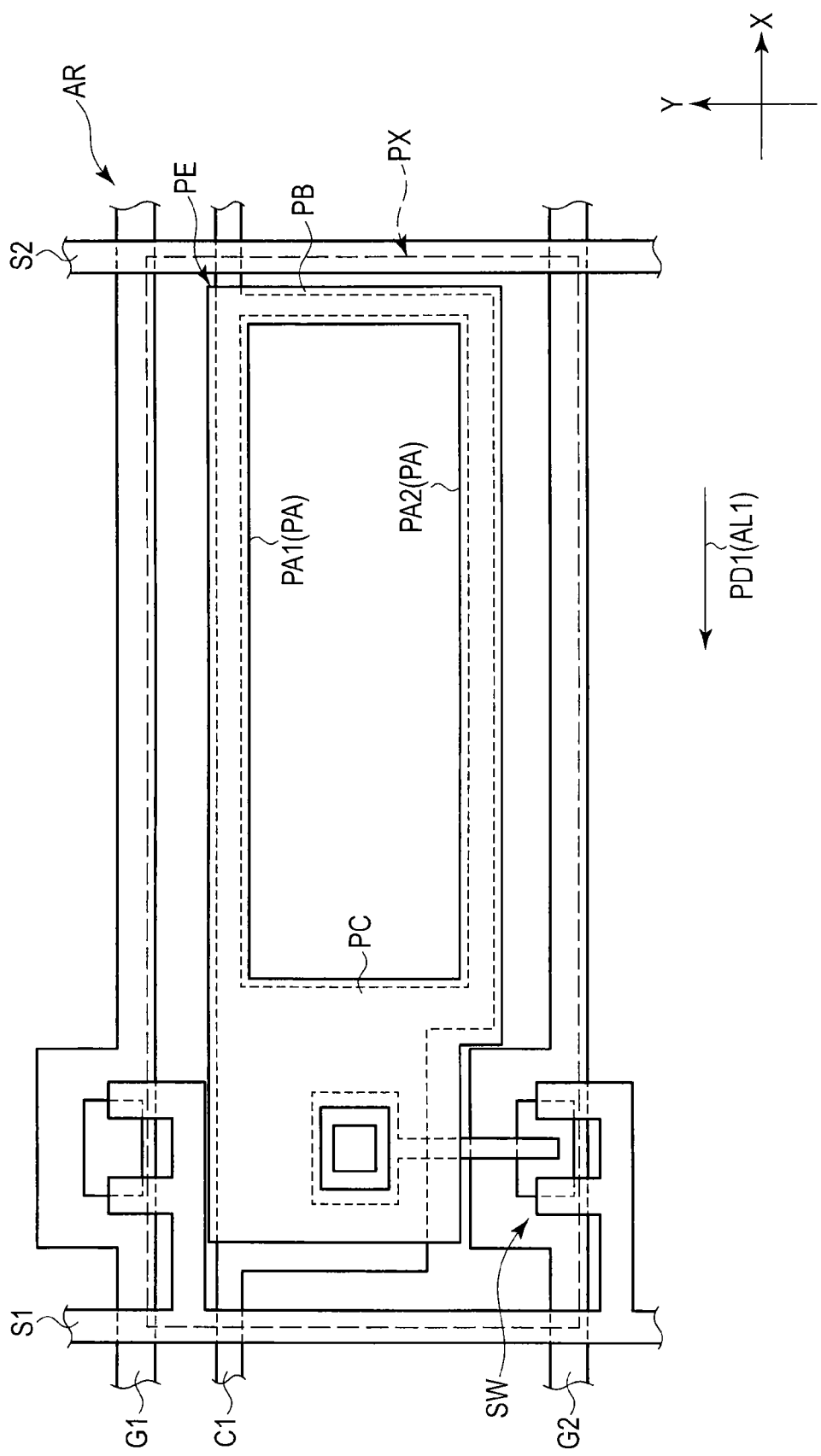
FIG. 11 is a plan view which schematically shows another structure example of the pixel at a time when the array substrate shown in FIG. 1 is viewed from the counter-substrate side.

FIG. 11 is a plan view which schematically shows another structure example of the pixel PX at a time when the array substrate AR shown in FIG. 1 is viewed from the counter-substrate side.

The structure example illustrated differs from the structure example shown in FIG. 9 in that a capacitance is produced not only between the storage capacitance line C1 and the main pixel electrode PA1, but also between the storage capacitance line C1 and the main pixel electrode PA2. The structure example shown in FIG. 11 corresponds to a structure example which is obtained by forming each of the pixel electrode PE and storage capacitance line C1 in a loop shape in the structure example shown in FIG. 6. Specifically, the storage capacitance line C1 is formed in a loop shape, like the pixel electrode PE, and is located immediately below the contact portion PC, immediately below the main pixel electrode PA1, immediately below the main pixel electrode PA2, and immediately below the connection portion PB.

According to the structure example shown in FIG. 11, a greater capacitance than in the structure example shown in FIG. 9 can be produced, without decreasing the area of the transmissive region in the aperture portion AP. Furthermore, the redundancy of not only the pixel electrode PE but also the storage capacitance line C1 can be improved, and even if breakage occurs in a part of the storage capacitance line C1, for example, immediately below the main pixel electrode PA1, the storage capacitance voltage can be supplied to the entirety of the storage capacitance line C1 via a path extending immediately below the main pixel electrode PA2.

Figure 12:
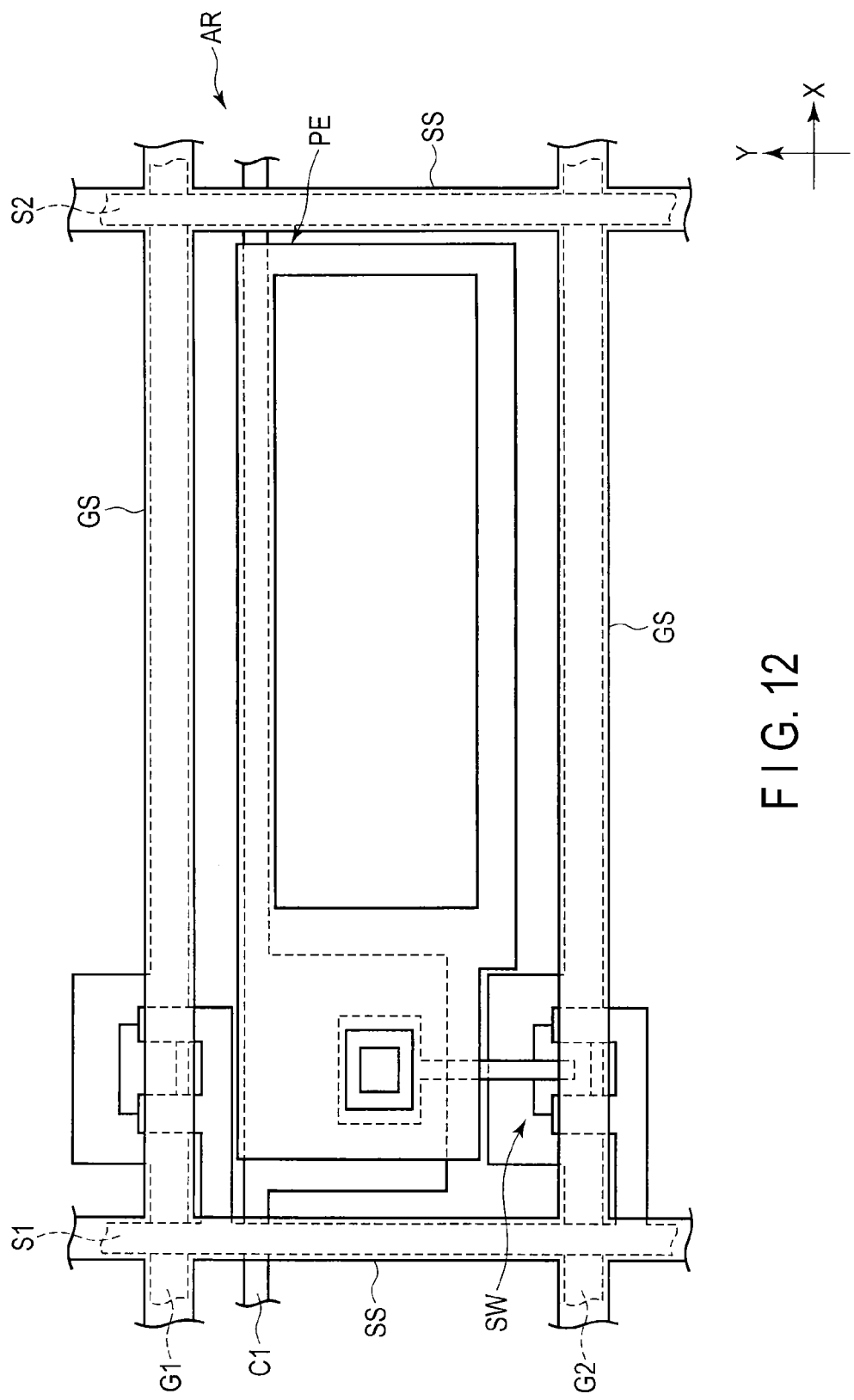
FIG. 12 is a plan view which schematically shows another structure example of the pixel at a time when the array substrate shown in FIG. 1 is viewed from the counter-substrate side.

FIG. 12 is a plan view which schematically shows another structure example of the pixel PX at a time when the array substrate AR shown in FIG. 1 is viewed from the counter-substrate side.

The structure example illustrated differs from the structure example shown in FIG. 9 in that the array substrate AR includes a gate shield electrode GS and a source shield electrode SS. The structure example shown in FIG. 11 corresponds to a structure example which is obtained by forming the pixel electrode PE in a loop shape in the structure example shown in FIG. 7. Specifically, the gate shield electrode GS is opposed to each of the gate line G1 and gate line G2. The source shield electrode SS is opposed to each of the source line S1 and source line S2. The details of the gate shield electrode GS and source shield electrode SS are as have been described with reference to FIG. 7.

According to the structure example shown in FIG. 12, the same advantageous effects as with the structure example shown in FIG. 7 can be obtained. In addition, the redundancy of the pixel electrode PE can be improved.

Needless to say, the above-described gate shield electrode GS and source shield electrode SS are applicable to the structure example shown in FIG. 11.

FIG. 13 is a plan view which schematically shows another structure example of the pixel PX at a time when the array substrate AR shown in FIG. 1 is viewed from the counter-substrate side.

The structure example illustrated differs from the structure example shown in FIG. 9 in that the gate line G is disposed at a substantially central part of the pixel PX. Specifically, the structure example shown in FIG. 13 corresponds to a structure example which is obtained by forming the pixel electrode PE in a loop shape in the structure example shown in FIG. 8.

Compared to the structure example shown in FIG. 9, the array substrate of the structure example shown in FIG. 13 is applicable to the case of such specifications that the capacitance, which is produced between the pixel electrode PE and the storage capacitance line C1, is relatively small.

As has been described above, according to the present embodiment, a liquid crystal display device, which can realize cost reduction and can suppress degradation in display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including a first gate line and a second gate line which extend in a first direction, a first source line and a second source line which extend in a second direction crossing the first direction, a switching element which is electrically connected to the first gate line and the first source line, and a pixel electrode which is located in an inside surrounded by the first gate line, the second gate line, the first source line and the second source line, the pixel electrode including a contact portion which is in contact with the switching element, two or more main pixel electrodes which extend in the first direction from the contact portion, and a connection portion which extends in the second direction and connects the main pixel electrodes;
   a second substrate including a common electrode including main common electrodes which are located above the first gate line, above the second gate line and above a point between the main pixel electrodes and extend in the first direction, and sub-common electrodes which are located above the first source line and above the second source line and extend in the second direction; and
   a liquid crystal layer including liquid crystal molecules held between the first substrate and the second substrate;
   wherein the pixel electrode is disposed in a pixel having a greater length in the first direction than in the second direction;
   wherein alignment of the liquid crystal molecules is controlled by an electric field produced between the main pixel electrodes extending in the first direction and the main common electrodes extending in the first direction;
   wherein the first substrate further includes a storage capacitance line which extends in the first direction between the first gate line and the second gate line and produces a capacitance between the storage capacitance line and the pixel electrode;
   wherein at least one of the main pixel electrodes is located above the storage capacitance line;
   wherein the contact portion is located on a side nearer the first source line;
   wherein each of the main pixel electrodes extends in the first direction from the contact portion toward the second source line; and
   wherein the storage capacitance line includes a protrusion opposing to the contact portion, and is located on a side nearer the first gate line.

2. The liquid crystal display device of claim 1, wherein the second substrate further includes a black matrix which is located above the first gate line, the second gate line, the first source line, the second source line, the switching element, the contact portion, and the connection portion.

3. The liquid crystal display device of claim 1, wherein the first substrate further includes gate shield electrodes which are opposed to the first gate line and the second gate line and have the same potential as the common electrode.

4. The liquid crystal display device of claim 3, wherein the first substrate further includes source shield electrodes which are opposed to the first source line and the second source line and have the same potential as the common electrode.

5. A liquid crystal display device comprising:
   a first substrate including a first gate line and a second gate line which extend in a first direction, a first source line and a second source line which extend in a second direction crossing the first direction, and a pixel electrode which is located in an inside surrounded by the first gate line, the second gate line, the first source line and the second source line and includes main pixel electrodes which define an electrode aperture portion extending in the first direction;
   a second substrate including a common electrode including main common electrodes which are located above the first gate line, above the second gate line and above the electrode aperture portion and extend in the first direction, and sub-common electrodes which are located above the first source line and above the second source line and extend in the second direction; and a liquid crystal layer including liquid crystal molecules held between the first substrate and the second substrate;
   wherein the electrode aperture portion has a rectangular shape having a greater length in the first direction than in the second direction;
   wherein the first gate line and the second gate line are disposed with a first pitch along the second direction, and the first source line and the second source line are disposed with a second pitch along the first direction, the second pitch being greater than the first pitch;
   wherein alignment of the liquid crystal molecules is controlled by an electric field produced between the main pixel electrodes extending in the first direction and the main common electrodes extending in the first direction;
   wherein the first substrate further includes a storage capacitance line which extends in the first direction between the first gate line and the second gate line and produces a capacitance between the storage capacitance line and the pixel electrode;
   wherein at least one of the main pixel electrodes is located above the storage capacitance line;
   wherein the contact portion is located on a side nearer the first source line;
   wherein each of the main pixel electrodes extends in the first direction from the contact portion toward the second source line; and
   wherein the storage capacitance line includes a protrusion opposing to the contact portion, and is located on a side nearer the first gate line.

6. The liquid crystal display device of claim 5, wherein the first substrate further includes gate shield electrodes which are opposed to the first gate line and the second gate line and have the same potential as the common electrode.

7. The liquid crystal display device of claim 5, wherein the first substrate further includes source shield electrodes which are opposed to the first source line and the second source line and have the same potential as the common electrode.

8. A liquid crystal display device comprising:
   a first substrate including a first gate line and a second gate line which extend in a first direction, a storage capacitance line which extends in the first direction between the first gate line and the second gate line, a first source line and a second source line which extend in a second direction crossing the first direction, and a pixel electrode which is located in an inside surrounded by the first gate line, the second gate line, the first source line and the second source line, the pixel electrode including a contact portion which is in contact with the switching element and two or more main pixel electrodes extending in the first direction from the contact portion, at least one of the main pixel electrodes being located above the storage capacitance line;
   a second substrate including a common electrode including main common electrodes which are located above the first gate line, above the second gate line and above a point between the main pixel electrodes and extend in the first direction, and sub-common electrodes which are located above the first source line and above the second source line and extend in the second direction; and a liquid crystal layer including liquid crystal molecules held between the first substrate and the second substrate;

wherein the first gate line and the second gate line are disposed with a first pitch along the second direction, and the first source line and the second source line are disposed with a second pitch along the first direction, the second pitch being greater than the first pitch;

wherein alignment of the liquid crystal molecules is controlled by an electric field produced between the main pixel electrodes extending in the first direction and the main common electrodes extending in the first direction;

wherein the contact portion is located on a side nearer the first source line;

wherein each of the main pixel electrodes extends in the first direction from the contact portion toward the second source line; and wherein the storage capacitance line includes a protrusion opposing to the contact portion, and is located on a side nearer the first gate line.

9. The liquid crystal display device of claim 8, wherein the second substrate further includes a black matrix which is located above the first gate line, the second gate line, the first source line, the second source line, and the contact portion.

10. The liquid crystal display device of claim 8, wherein the first substrate further includes gate shield electrodes which are opposed to the first gate line and the second gate line and have the same potential as the common electrode.

11. The liquid crystal display device of claim 8, wherein the first substrate further includes source shield electrodes which are opposed to the first source line and the second source line and have the same potential as the common electrode.

12. The liquid crystal display device of claim 8, wherein in a state in which no electric field is produced between the main pixel electrodes and the main common electrodes, an initial alignment direction of the liquid crystal molecules is substantially parallel to a direction of extension of the main pixel electrodes.

13. The liquid crystal display device of claim 12, wherein in a state in which no electric field is produced between the main pixel electrodes and the main common electrodes, the liquid crystal molecules are splay-aligned or homogeneously aligned between the first substrate and the second substrate.

14. The liquid crystal display device of claim 13, further comprising a first polarizer which is disposed on an outer surface of the first substrate, and a second polarizer which is disposed on an outer surface of the second substrate, a first polarization axis of the first polarizer and a second polarization axis of the second polarizer being perpendicular to each other, and the first polarization axis being perpendicular or parallel to the initial alignment direction.

* * * * *